(12) United States Patent
Crombez et al.

(10) Patent No.: US 6,687,593 B1
(45) Date of Patent: Feb. 3, 2004

(54) COMBINED REGENERATIVE AND FRICTION BRAKING SYSTEM FOR A VEHICLE

(75) Inventors: Dale Scott Crombez, Livonia, MI (US); Steven Lee Napier, Canton, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 10/064,996

(22) Filed: Sep. 6, 2002

(51) Int. Cl.[7] ................................................. G06F 7/00
(52) U.S. Cl. ........................ 701/71; 180/170; 318/372; 318/376
(58) Field of Search .............................. 701/71, 73, 70, 701/80, 82, 90, 91; 303/151, 152; 318/371, 372, 376; 180/170

(56) References Cited

U.S. PATENT DOCUMENTS

| | | | |
|---|---|---|---|
| 5,086,865 A | 2/1992 | Tanaka et al. | |
| 5,291,960 A | 3/1994 | Brandenburg et al. | |
| 5,839,533 A | 11/1998 | Mikami et al. | |
| 5,915,801 A | 6/1999 | Taga et al. | |
| 6,099,089 A | 8/2000 | Schneider | |
| 6,122,585 A | * | 9/2000 | Ono et al. ..................... 701/71 |
| 6,122,588 A | 9/2000 | Shehan et al. | |
| 6,176,808 B1 | 1/2001 | Brown et al. | |

* cited by examiner

*Primary Examiner*—Yonel Beaulieu
*Assistant Examiner*—Olga Hernandez
(74) *Attorney, Agent, or Firm*—Dykema Gossett PLLC; Carlos L. Hanze

(57) ABSTRACT

A combined regenerative and friction braking system for the road wheels of a vehicle includes a friction braking subsystem, a regenerative braking subsystem coupled to the road wheels equipped with the friction braking subsystem, and a brake system controller for controlling both the friction and regenerative braking subsystems such that regenerative braking is restored to a maximum practicable value following conclusion of an antilock braking event.

14 Claims, 4 Drawing Sheets

COMBINED REGENERATIVE AND FRICTION BRAKING SYSTEM FOR A VEHICLE

BACKGROUND OF INVENTION

1. Field of the Invention

The present invention relates to a method and system for achieving maximum regenerative braking capability for a vehicle having both regenerative and friction braking subsystems, while maintaining transparency of the transition between friction braking and regenerative braking following an antilock brake system (ABS) event.

2. Disclosure Information

Electrodrive vehicles have been designed, and built for many years. Regenerative braking allows such vehicles to present the attractive possibility of salvaging and transforming into potential energy, kinetic energy which would otherwise be converted into thermal energy in a friction braking system. Nevertheless, it is common with current vehicles having electrodrive capability to maintain both regenerative and friction braking subsystems, because of the inherent advantage provided by having both types of brakes available on the vehicle. Thus, it is known to use friction brakes to achieve ABS capability, while employing regenerative braking to a greater or lesser extent when the ABS is not in operation. U.S. Pat. No. 6,122,588, although showing the combination of regenerative braking with friction braking, does not disclose or teach any system or method for handling the regenerative braking in conjunction with ABS provided by a friction braking subsystem.

It is important to handle the interface between the friction braking subsystem and the regenerative braking subsystem properly, particularly within the moments following an ABS event. Because operation during ABS is usually accomplished with concomitant disablement of the regenerative braking subsystem, it is necessary to re-introduce the regenerative braking subsystem at the conclusion of an ABS event. This re-introduction of regenerative braking must be handled correctly so as not to trigger a new ABS event. A system and method according to the present invention is intended to allow regenerative braking to be re-introduced to the maximum possible extent without causing either additional ABS events or objectionable brake torque fluctuations.

It has been determined by the present inventors that when operating a combined braking system having regenerative and friction braking subsystems, it is also important that the regenerative braking limit, which is the contemporaneous maximum regenerative brake torque, taking into consideration the regenerative system limitations and road conditions, be increased only in conjunction with balanced braking. It is of course undesirable to attempt to apply the regenerative brakes at a torque in excess of the torque which may be sustained by the surface upon which the vehicle is being operated. Thus, if the driver demands a brake torque in excess of that achievable by the regenerative braking subsystem, friction braking will be employed to achieve the desired level of braking. This method of operation will achieve the maximum regenerative effect without causing needless ABS events.

SUMMARY OF INVENTION

A combined regenerative and friction braking system for the road wheels of a vehicle includes a friction braking subsystem, a regenerative braking subsystem coupled to the road wheels equipped with the friction braking subsystem, and a brake system controller which operates the braking subsystems in an antilock mode, as required. The brake system controller controls and operates both the friction braking subsystem and the regenerative braking subsystem such that operation in the antilock operating mode will be followed by a period of operation in which the maximum braking torque applied by the regenerative braking subsystem to a particular axle is limited to a level comparable to the maximum braking torque applied by the friction braking subsystem as well as by the regenerative braking system as a period of antilock operation ends. The brake system controller operates the regenerative braking subsystem so as to restore regenerative braking torque up to a maximum value as quickly as possible. In essence, the regenerative braking torque limit is ratcheted up to a maximum value in accord with the total brake torque generated by the regenerative and friction brakes on the axle.

The regenerative braking subsystem may comprise a rotating electrical machine coupled to at least one road wheel as well as to an electrical storage device. Alternatively, a regenerative braking subsystem may comprise a hydraulic pump/motor coupled to at least one road wheel as well as to a hydraulic energy storage device. Other types of regenerative braking are suitable for use with a system according to the present invention, including kinetic energy storage devices. What is important is that the vehicle have a means for coupling at least one road wheel to an energy storage device so that kinetic energy in the vehicle may be captured as potential energy in the energy storage device whenever braking occurs.

According to another aspect of the present invention, a brake system controller operates a friction braking subsystem and a regenerative braking subsystem such that when antilock operation ceases, brake torque will initially be applied by both the regenerative and friction braking subsystems, with the controller transitioning to a state in which all of the demanded brake torque is applied by the regenerative braking system whenever the balanced brake torque is less than a maximum system value.

A system and method according to present invention may be applied to each of the road wheels of a vehicle. That is, each of the road wheels may be integrated into a friction braking and regenerative braking subsystem according to the present invention.

According to another aspect of the present invention, a method for operating friction braking and regenerative braking subsystems includes the steps of operating either solely the friction braking subsystem, or both the friction and regenerative braking subsystems in an antilock mode, and transitioning from an antilock mode to a mode in which the fraction of demanded braking torque provided by the friction braking subsystem is decreased while the fraction of demanded braking torque provided by the regenerative braking system is increased.

The maximum allowable brake torque developed by the regenerative system while operating in the maximum regeneration mode is the lesser of the maximum torque capability of the regenerative braking system and the balanced braking torque demanded by the driver of the vehicle.

According to another aspect of present invention, the contemporaneous maximum permissible torque for the regenerative braking system is based upon at least the amount of time which has elapsed since the cessation of the latest period of operation in antilock mode. Further, if the vehicle's operator further depresses the accelerator, the maximum torque capability of the system will be reinstated. This will be the maximum system torque. If the net torque requested by the driver becomes a drive torque rather than a brake torque, the maximum regenerative capability is restored.

DETAILED DESCRIPTION

A braking system according to the present invention includes brake controller 200, which may be drawn from the class of controllers commonly used for chassis, ABS, and traction control. Such controllers are known to those skilled in the art and suggested by this disclosure. Controller 200 is connected with a variety of sensors 210 including brake and accelerator pedal sensors, brake fluid line pressure sensors, wheel speed sensors, motor current sensors, and other types of sensors known to those skilled in the art and suggested by this disclosure. Controller 200 operates friction brake subsystem 212 and regenerative brake subsystem 214. Friction brake subsystem 212 may comprise any of the commonly employed braking systems having ABS capability, such as various hydraulically powered braking systems.

Figure 1:
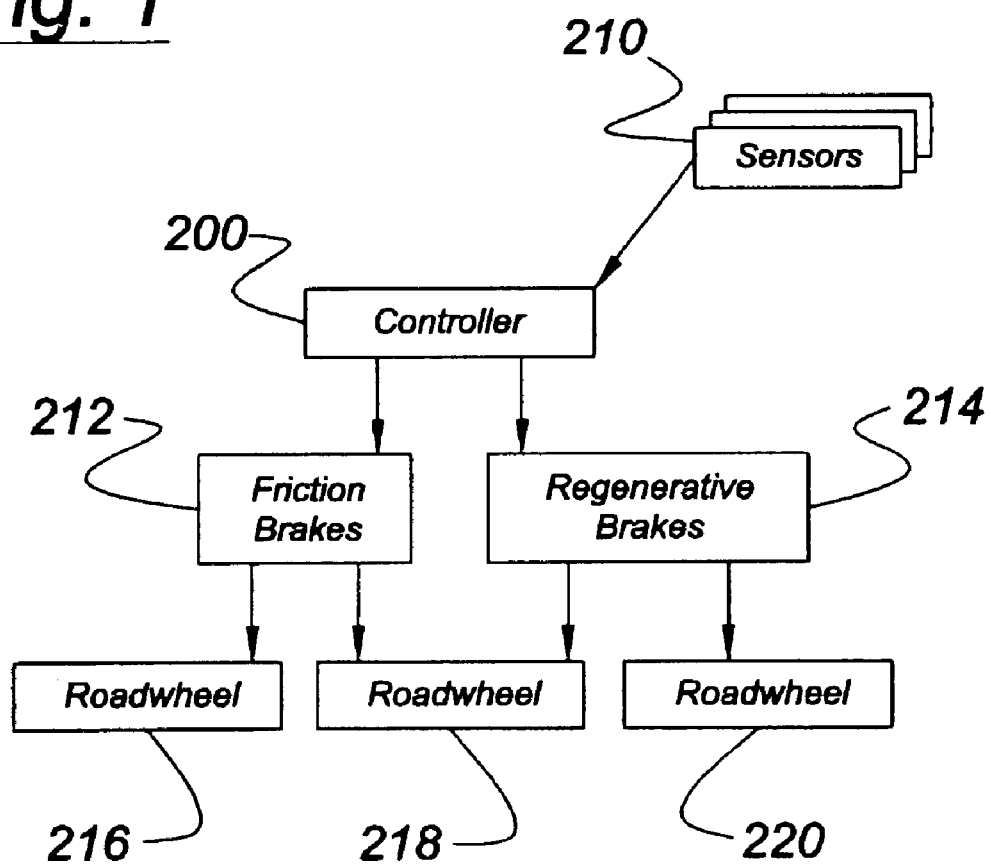
FIG. 1 is a block diagram of a combined regenerative and friction braking system for a vehicle according to present invention.

Controller 200 also operates regenerative brake subsystem 214, which may comprise either electrodrive motor-generator units both driven by and driving the road wheels of a vehicle, or hydraulic motors or other types of devices for converting kinetic energy in a moving vehicle to potential energy in a energy storage device. As shown in FIG. 1, a plurality of road wheels is braked by friction brakes 212 and regenerative brakes 214. Thus, road wheel 216 is braked solely by friction brakes 212 as opposed to road wheel 218, which is braked by friction brake subsystem 212 and regenerative brake subsystem 214. Finally, road wheel 220 is braked solely by regenerative brakes 214. Those skilled in the art will understand in view of this disclosure that a system according to the present invention could be used with any of the combinations shown in FIG. 1, i.e., regenerative braking of all road wheels or some road wheels with friction braking on some or all of the road wheels.

Figure 2:
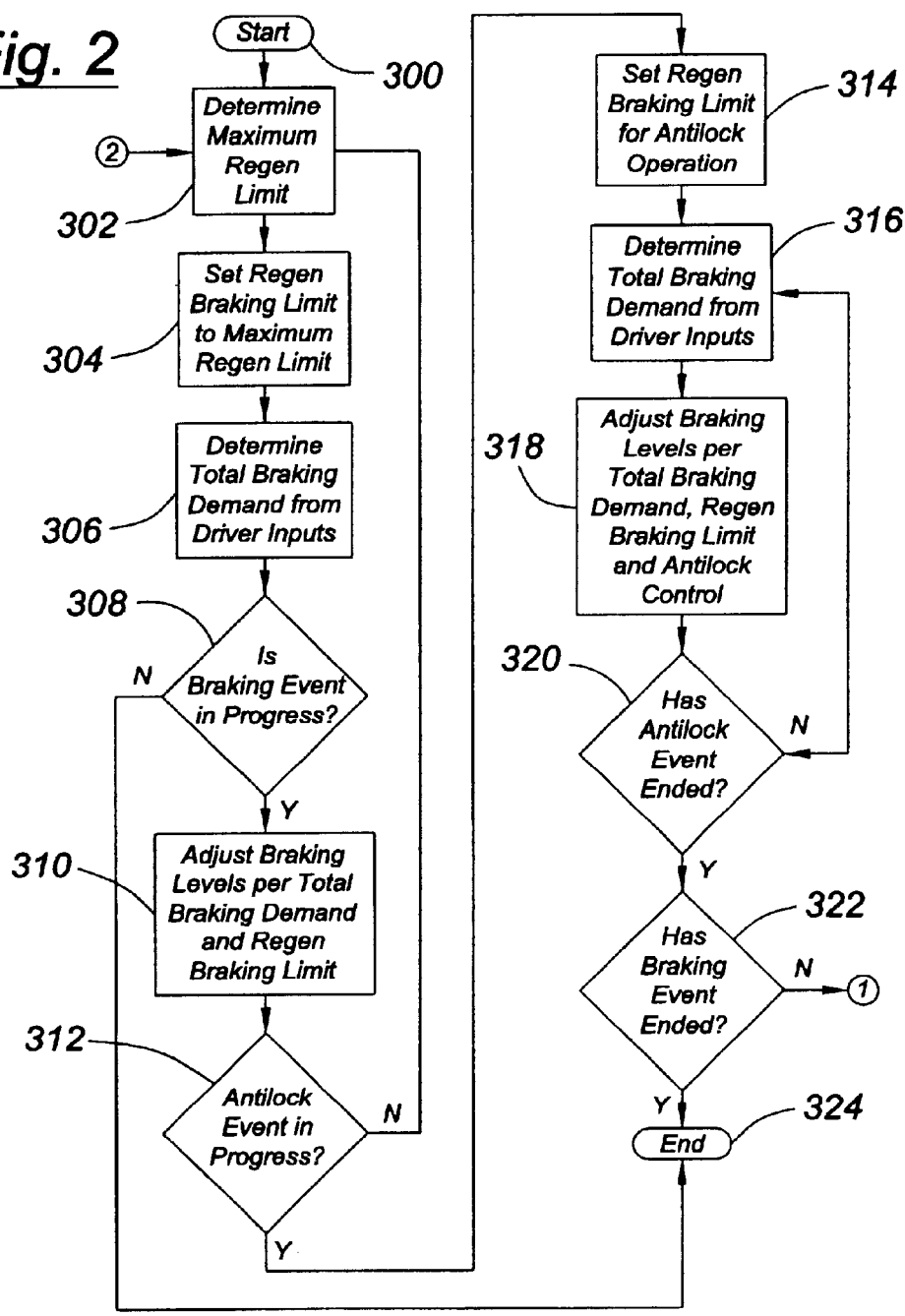
FIG. 2 is a flow chart showing basic operation of a combined braking system according to the present invention.

Moving now to FIG. 2, controller 200 starts at block 300 and moves to block 302 where the maximum regenerative braking limit is determined. This maximum regenerative braking limit is based upon system considerations, such as for electrodrive vehicles, the temperature of the battery, state of charge of the battery and other system parameters known to those skilled in the art and suggested by this disclosure. After determining the maximum regenerative braking limit at block 302, controller 200 moves to block 304 where the regenerative braking limit is set to the maximum regenerative braking limit determined at block 302. Then, the routine moves to block 306, wherein driver inputs are assessed by means of the outputs from sensors 210, to determine the driver's intent to apply the brakes. This assessment may include such inputs as brake pedal force, accelerator position, gear position, and other variables known to those skilled in the art and suggested by this disclosure. At block 308, a question is asked about whether a braking event is in progress. If the answer is "no" at block 308, the routine ends at block 324. Thus, the regenerative braking limit remains set at the maximum regen limit. If the answer however at block 308 is "yes", the routine moves to block 310, wherein friction and regenerative brakes are applied according to the total braking demand by the driver (from block 306) and the regenerative braking limit. Then the routine moves to block 312 where a question is asked about whether an ABS event is in progress. If the answer is "no", the routine recycles to block 302, where the maximum regenerative braking limit is updated.

The question posed in block 308—i.e., whether a braking event is in progress, may be answered in the affirmative not only if the driver is applying the brakes via the brake pedal, but also if the driver is depressing the accelerator an insufficient amount to result in a net drive torque. In other words, if the driver is depressing the accelerator such that the equivalent of compression braking with an I.C. engine would be present, the brake event has not ended.

If the answer to the question posed at block 312 is "yes", the routine moves to block 314, where the regenerative braking limit is set to an ABS active regenerative limit. This is normally a greatly reduced brake torque which is intended to allow controller 200 full authority to quickly modulate braking torque on the individual wheels prevent the road wheels which are subject to regenerative braking from locking up so as to thereby trigger an unwanted ABS event as a result of the regenerative braking.

Figure 3:
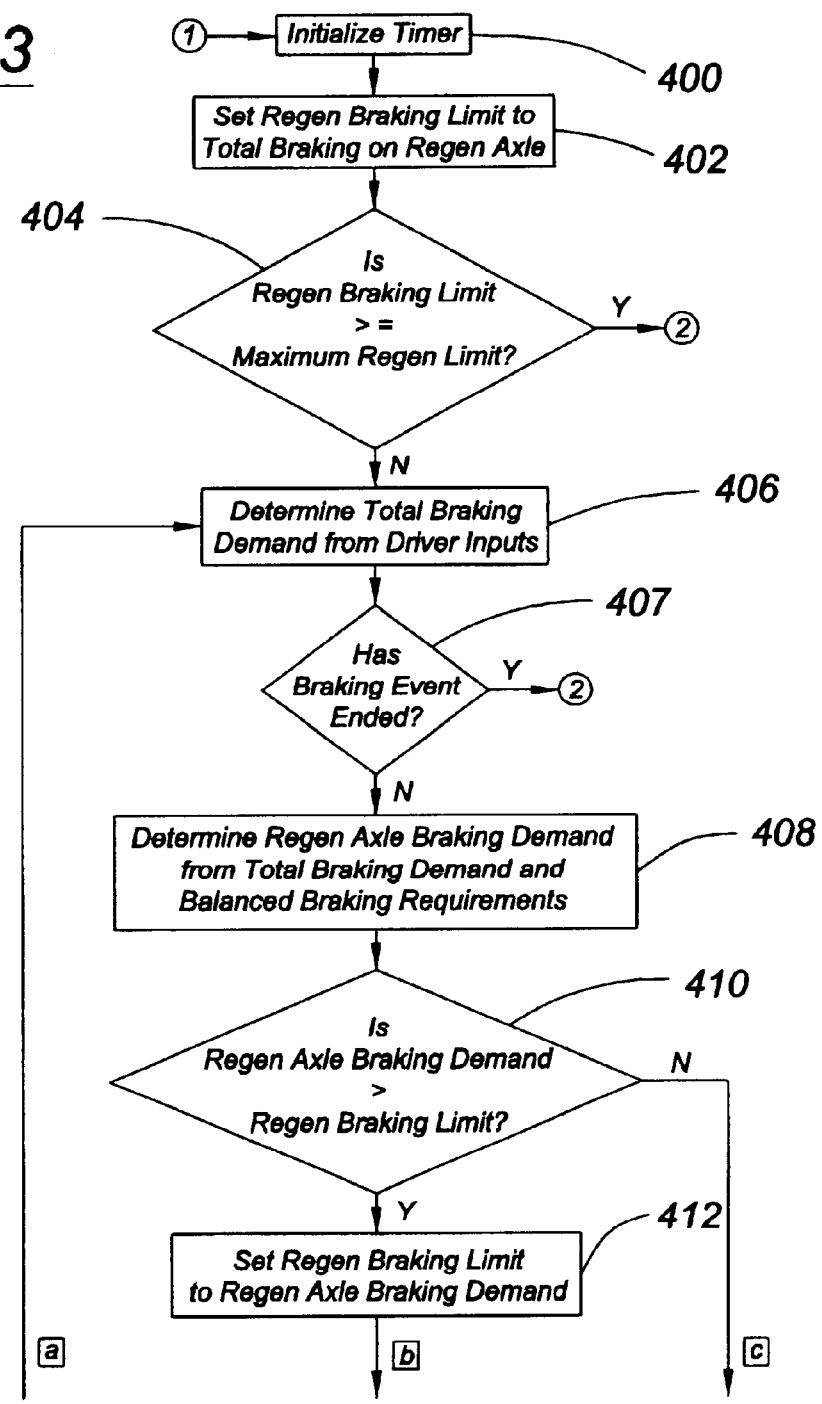
FIG. 3 is a flow chart showing a method for re-starting regenerative braking following an antilock braking event.

At block 316, controller 200 determines the braking demand imposed by the vehicle's operator, as was done at block 306. Then the routine moves to block 318 and adjusts the braking levels to account for the new total brake demand from block 316, as well as for the regenerative braking limit, and for the fact that ABS is functioning. In essence, at block 318, the ABS algorithms are applied. These may be of the type generally known to those skilled in the art of automotive ABS systems and suggested by this disclosure, and the result is operation by controller 200 of friction braking subsystem 212, and if desired, regenerative braking subsystem 214, in an antilock mode. Then, controller 200 moves to block 320, wherein the status of the ABS event is queried. If the ABS event is not over, the routine recycles to block 316 to determine new driver inputs and resulting total brake demand and continues with block 318. If however, the answer to the question posed in block 320 is in the affirmative, the ABS event is over, and the routine moves to block 322, where a question is posed regarding continuation of the braking event. If the brake event is indeed over, as was discussed in connection with block 308, the routine ends at block 324. If however, the braking event is not over, the routine moves to block 400 in FIG. 3. A timer is started at block 400. This timer is intended to prevent the combined regenerative and friction braking system from conducting repeated ABS events resulting from an overly aggressive application of regenerative braking immediately following an ABS event. Once the timer has timed out, the regenerative braking limit is set to the system's maximum regenerative braking limit at block 304 of FIG. 2.

Figure 4:
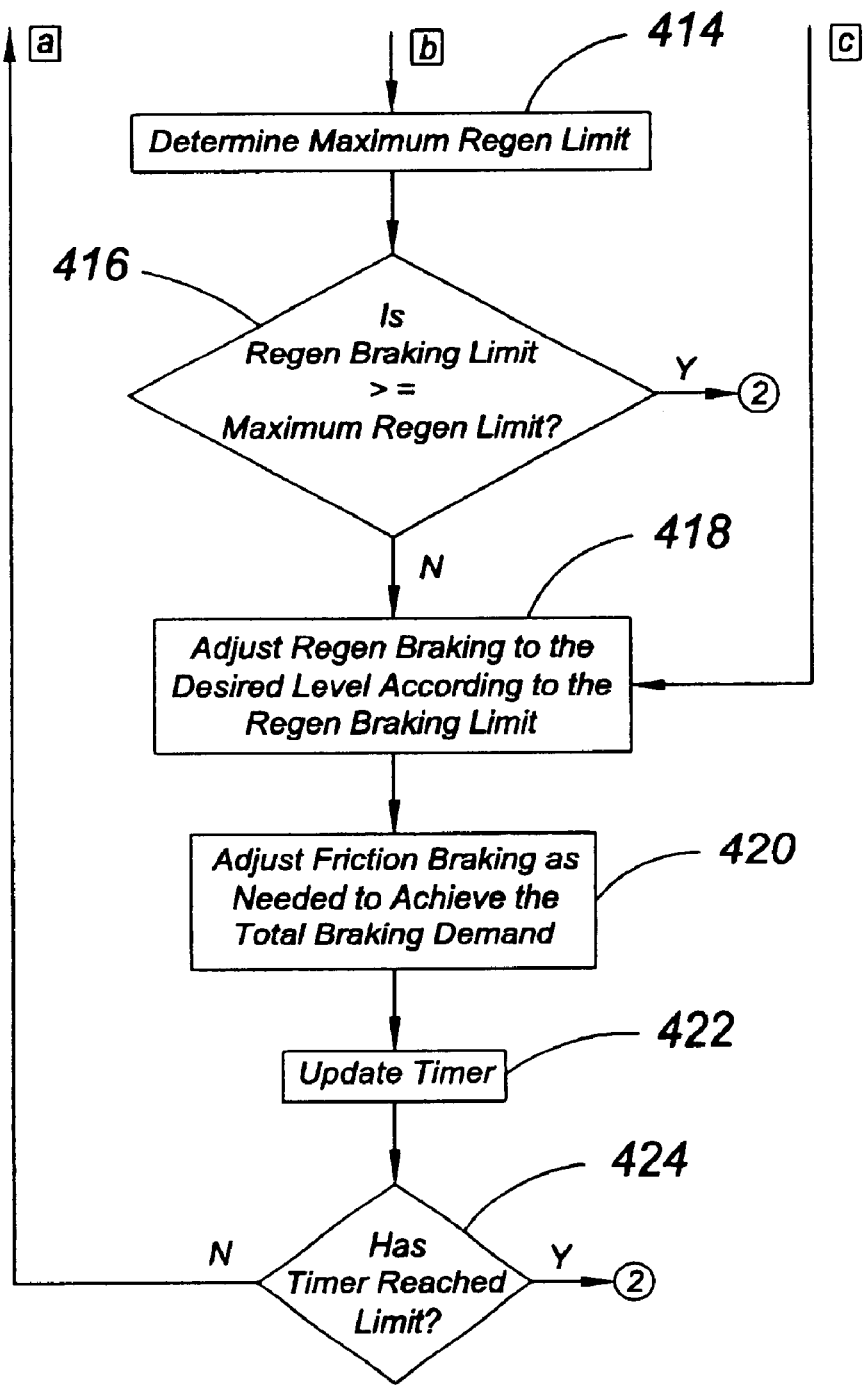
FIG. 4 is a continuation of the flow chart of FIG. 3.

Post-ABS regenerative operation begins in earnest at block 402 and continues through the steps of FIG. 4. In essence, the present process and method may be termed a "ratchet up" operation because the post-ABS regenerative braking limit will be increased as the vehicle is braked over time, but the limit will not be decreased, even when total brake demand decreases. In this manner, maximum regenerative operation is achieved.

At block 402, controller 200 sets the post-ABS regenerative braking limit equal to the total brake torque then being applied to the regen axle in question. Moving to block 404, the routine asks whether the post-ABS regen braking limit is greater than the maximum regeneration limit for the system. This max limit has previously been described as the maximum brake torque which can be generated by the regenerative system, given the contemporaneous state of the battery (for an electrodrive system), as well as the ambient temperature, and other vehicle operating parameters.

If the answer to the question posed at block 404 is "yes", the post-ABS brake torque is deemed to be fully ratcheted up to the max regeneration limit, and the routine recycles to block 302 of FIG. 2 and continues. If, however, the answer at block 404 is "no", controller 200 moves to block 406, wherein the total braking demand is determined, as in blocks 306 and 316 of FIG. 2. Then, at block 407, the status of the brake event is queried. If the brake event is over, the routine moves to block 302 of FIG. 2 and continues. If, however, the braking event is not concluded at block 407, the routine moves to block 408, where a new braking demand for the regenerative braking subsystem is determined from the total braking demand (determined in block 406) and balanced braking requirements. In general, balanced braking requires that the brake torque applied to a given axle comport with the load carried by the axle.

Having determined the braking demand for the regenerative axle at block 408, the routine moves to block 410, where the regen axle braking demand is compared with the regenerative braking limit. If the regen axle braking demand is greater than the regen braking limit at block 410, the routine moves to block 412 and the regen braking limit is set equal to the regen axle braking demand. If however, the answer to the question of block 410 is "no", the routine moves to block 418, where the regen braking is adjusted according to the current regen braking limit. Then the routine moves to block 420, where the friction braking is adjusted to reach the total braking demand imposed by the driver. Then, the timer which was started at block 400 is updated at block 422. If the timer has reached a predetermined limit at block 424, the routine recycles to block 302 of FIG. 2. If the answer at block 424 is "no", the routine moves to block 406-and continues.

If the answer to the question in block 410 is "yes", controller 200 moves to block 412 as previously described. Then the routine determines the maximum regenerative braking limit at block 414, using the same considerations as with block 302 of FIG. 2. At block 416, the regen braking limit is compared with the maximum regen limit determined in block 414. In the event that the answer to the question of block 416 is "yes", the routine returns to block 302 of FIG. 2. If not, the routine continues to block 418 and proceeds as previously described. In this manner, the maximum benefit is obtained from the regenerative braking system, without unwanted ABS operation, and without annoying the driver due to unnecessary switching between non-ABS and ABS operation. As an alternative, is the answer to the question posed at block 416 is yes, the regenerative braking limit may merely be set equal the the maximum regenerative limit, with the routine then continuing with block 418.

Although the present invention has been described in connection with particular embodiments thereof, it is to be understood that various modifications, alterations and adaptations may be made by those skilled in the art without departing from the spirit and scope of the invention. It is intended that the invention be limited only by the appended claims.

What is claimed is:

1. A method of operating friction and regenerative braking subsystems in a vehicle following the end of an ABS event, wherein a regenerative braking limit for an axle is first set to approximate the total braking torque developed by the friction and regenerative brakes associated with the axle as the ABS event ends, with the regenerative braking torque thereafter being increased, but not decreased, in accord with the total brake torque assigned to that axle according to the driver's braking demand and the requirements of balanced braking following the ABS event.

2. A method according to claim 1, wherein said regenerative braking limit is set equal to the total balanced brake torque on the regenerative axle if the total balanced brake torque is greater than a previously determined regenerative braking limit.

3. A method according to claim 2, wherein said regenerative braking limit is set so as not to exceed a maximum regenerative system brake torque.

4. A method according to claim 1, wherein the regenerative braking limit is set to a maximum regenerative system brake torque when the driver's demand for braking is removed.

5. A method according to claim 1, wherein the regenerative braking limit is set to a maximum regenerative system brake torque if the amount of time following the end of an ABS event exceeds a predetermined threshold.

6. A method according to claim 5, wherein said vehicle has an electrodrive regenerative braking system, and the maximum system brake torque is the maximum regenerative brake torque which may be developed by the regenerative braking system for the axle in question, where said maximum brake torque is a function of at least the state of charge of an electric storage battery connected with an electrodrive motor-generator unit.

7. A combined regenerative and friction braking system for road wheels of a vehicle, comprising:

a friction braking subsystem coupled to a plurality of road wheels;

a regenerative braking subsystem coupled to the road wheels equipped with the friction braking subsystem; and a brake system controller for controlling both the friction braking subsystem and the regenerative braking subsystem, such that operation in an antilock operating mode will be followed by a period of operation in which the maximum braking torque applied by the regenerative braking subsystem to a particular axle is limited to a level comparable to the maximum brake torque applied by the friction and regenerative braking subsystems as antilock operation ended.

8. A combined regenerative and friction braking system according to claim 7, wherein the brake system controller operates the regenerative braking subsystem so as to increase available regenerative braking torque to a predetermined maximum system value as the brake torque demanded by the driver increases, with said controller maintaining the available regenerative braking torque at said maximum system value notwithstanding a decrease in the driver's braking demand.

9. A combined regenerative and friction braking system according to claim 7, wherein said regenerative braking subsystem comprises a rotating electrical machine coupled to said at least one road wheel, as well as to an electrical storage device.

10. A combined regenerative and friction braking system according to claim 7, wherein said regenerative braking subsystem comprises a hydraulic motor coupled to said at least one road wheel, as well as to a hydraulic storage device.

11. A combined regenerative and friction braking system according to claim 7, wherein said regenerative braking subsystem comprises a kinetic energy storage device coupled to said at least one road wheel.

12. A combined regenerative and friction braking system according to claim 7, wherein said controller operates the friction braking subsystem and the regenerative braking subsystem such that when antilock operation ceases brake torque will initially be applied by both the regenerative and friction braking subsystems, with said controller increasing the regenerative brake torque in accord with balanced braking demand until a maximum regenerative system brake torque is reached.

13. A combined regenerative and friction braking system according to claim 7, wherein said regenerative braking subsystem is applied to each of said plurality of road wheels to which the friction brakes are applied.

14. A method for operating friction braking and regenerative braking subsystems for the axle of a vehicle, comprising the steps of:

operating said friction braking subsystem in an antilock mode;

transitioning from the antilock mode to a mode in which maximum regenerative braking torque is immediately set to a post-ABS limit; and maintaining the regenerative braking torque at the post-ABS limit until a predetermined time has passed since the end of the antilock mode.

* * * * *

UNITED STATES PATENT AND TRADEMARK OFFICE
Certificate

Patent No. 6,687,593 B1                                            Patented: February 3, 2004

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Dale Scott Crombez, Livonia, MI; Steven Lee Napier, Canton, MI; and Michael Schneider, Bloomfield, MI.

Signed and Sealed this Sixth Day of July 2004.

THOMAS G. BLACK
*Supervisory Patent Examiner*
Art Unit 3661